Patented Oct. 11, 1949

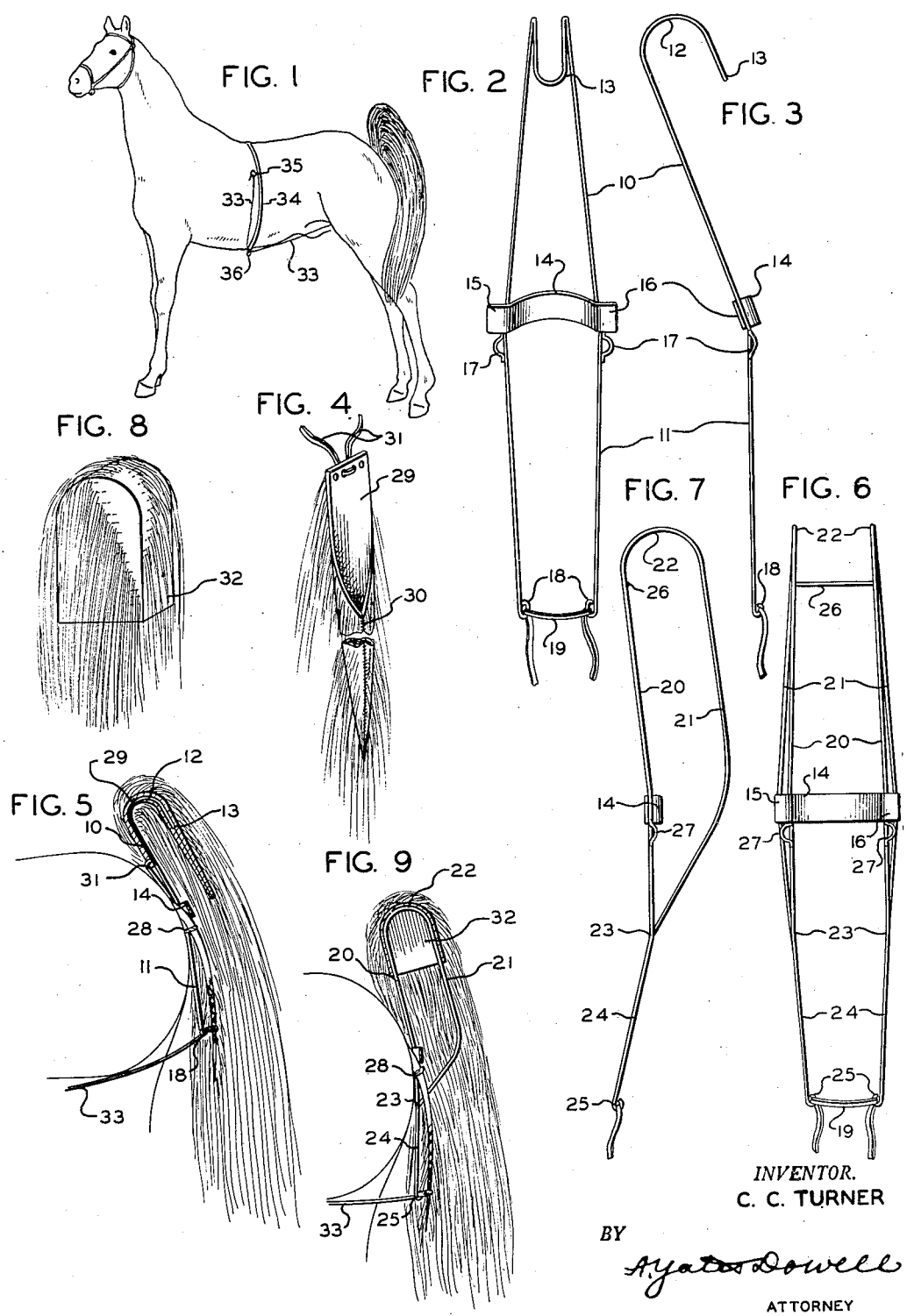

2,484,766

UNITED STATES PATENT OFFICE 2,484,766

HUMANE TAIL SET

Charles C. Turner, Broadway, Va., assignor of one-half to George S. Aldhiser II, Broadway, Va.

Application January 12, 1949, Serial No. 70,530

6 Claims. (Cl. 54—1)

1

This invention relates to showmanship and more particularly to the showing or displaying of horses or other animals under saddle, in extreme action at the various gaits in keen competition with other animals where fine stock are groomed and equipped to present the most satisfactory appearance to the public.

Animal shows appeal to the masses and the variety and character of the displays are given a great amount of attention in order to accomplish the utmost in appealing styles and fashions of horse fanciers.

The exhibition or display of fine horses includes the American saddle horse, the Tennessee walking horse and the light harness horse, and others, and everything which can be done to improve the appearance and increase interest in exhibitions of these animals is done without reservation. In exhibitions of this character certain factors are given importance including the manner in which certain portions of the horse are held, particularly the head and tail, as well as foot and leg action.

In the staging of horse shows, it is important and therefore desirable to display the horses in the most satisfactory manner with the most perfect body carriage. Fashion decrees that the tail of a horse stand substantially erect and in order to obtain this result, attempts have been made to train the tail of the horse. In addition resort has been made to surgery including the severing of the muscles on the underside of the horse's tail close to the body, so that the upper muscles will pull the tail upright, and then several inches further from the body the muscles are severed on the upper portion of the tail to cause the tail to droop or extend downwardly.

Surgery has been critized as inhumane and cruel, and frequently has brought disastrous results in that on occasions infection has resulted. On other occasions severing of the muscles has caused the drooping of the tail in a lifeless mass, with the loss of both shape and use. Frequently also surgery has produced an itching sensation causing the animal to squirm and scratch.

Another important objection to surgery is that afterwards it has been necessary for the animal to be kept confined with the tail in a harness, and when the horse is on display, it is frequently necessary to employ a brace to hold the tail in the proper erect position.

It is an object of the present invention to provide humane means for improving the appearance of the tail of a horse or other animal and by means of which the desired erect and beau-

2 tiful appearance is obtained and which it is only necessary to maintain during the time the animal is on display or only as long as is desired.

Another object of the invention is to provide means of the above character which is free from any criticism of cruelty to animals because it will in no way cause pain and the animal is natural before and after the use of the same as well as being capable of and at liberty to switch its tail in a normal manner both before and after the use of the same the natural tail being left in its normal relaxed position during use of this invention.

A further object of the invention is to provide a humane tail supplementation of simple, inexpensive, and readily obtainable construction, susceptible of being easily applied and removed, and which will blend with the natural tail and give the desired appearance.

Other objects of the present invention will be apparent from the following description taken in conjunction with the accompanying drawings, wherein:

Fig. 1 is a side view of a display or show horse with a tail incorporating the present invention;

Fig. 2, a front elevation of a frame for an auxiliary or artificial tail;

Fig. 3, a side elevation thereof;

Fig. 4, a perspective of the hair portion of an artificial tail for use in conjunction with the support of Figs. 2 and 3;

Fig. 5, a fragmentary part elevation, part sectional view illustrating the application of the hair forming the artificial tail of Fig. 4 to the support and in applied position;

Fig. 6, a front elevation of a modified type of support;

Fig. 7, a side elevation of the modified support of Fig. 6;

Fig. 8, a perspective of the hair portion of an artificial tail adapted to fit over the support illustrated in Figs. 6 and 7; and, Fig. 9, a fragmentary part sectional part side elevational view illustrating the application of a modified form of artificial tail to the modified support.

Briefly stated, the invention comprises a supplemental or auxiliary tail applicable to the natural tail of a horse for obtaining the desired erect position and configuration of the tail with resulting pleasing appearance.

The invention also comprises a support for the supplemental or auxiliary tail with attaching means by which it may be secured to the natural tail to blend with the same, the fact that it is artificial being inconspicuous, so that both the supplemental and natural tails appear to be one and the same.

The invention contemplates for the tail a support of any desired construction but preferably of light weight, which may be easily applied and removed and which, when applied, will not turn or easily move out of position.

While it is the accepted custom to employ artificial means for improving the position and appearance of the tail, the artificial or extra tails are usually added to the end of the natural tail, while in the present invention, the addition is adjacent to the top or highest portion of the tail.

In accordance with the present invention, for purposes of illustration, the supplemental unit tail as shown includes a skeleton framework of relatively light work material such as plastic, wood, hollow metal, wire or other material in order to add as little dead weight as possible to the animal to which it is applied. Further, the invention is provided with portions which readily conform to and fit against the natural tail of the animal. Two supports are disclosed for use with two different types of artificial tails; one with a full artificial tail, the other with a tail cap and only a portion of an artificial tail. With continued reference to the drawings, in Fig. 2 is disclosed a support having upper and lower portions 10 and 11 disposed at an angle to each other with the upper end reversely bent upon itself and providing a curved portion 12 terminating in a loop or arched end or hook portion 13.

Adjacent the junction or angle formed by the joint between the members 10 and 11 is disposed a saddle member 14 which is curved along its intermediate portion in order to conform or fit snugly against the upper side of the natural tail of the horse; the saddle member having its ends 15 and 16 in substantially the same plane to prevent rotation of the support on the tail of the horse and to afford a wider and more comfortable engagement with the buttocks of the horse.

The support is adapted to be held in position on the horse by means of a strap or other flexible member extending through ears 17 fastened to the lower section 11 of the support, one ear being mounted on each of the lower sections. The support has its lower ends provided with eyes 18 for the reception of a fastening strap or the like 19, the cross portion of which is adapted to be disposed within the plaits of the natural tail of the horse so that the support will not slip off or downwardly on the tail. It will be obvious that the support may be made of one piece with the exception of the attaching ears and saddle portion.

Instead of the support illustrated in Figs. 2 and 3, a support such as shown in Figs. 6 and 7 may be employed, such support comprising upper and lower portions somewhat similar to those of Figs. 2 and 3 but with the upper portion of somewhat larger overall size. Such upper portion comprises a pair of side frames, each having longitudinal members 20 and 21 connected by a curved intermediate portion 22 and the longitudinal members 20 and 21 being connected in a joint 23 depending from which is a single side member 24 terminating in an eye 25 at its lower end. The parts just described form a side frame which, with an opposed side frame of similar nature, constitutes the main body of the support. The side frames are connected by a cross member 26 adjacent the upper end of the support and with a substantially flat saddle member 14, such saddle member being like that shown in Figs. 2 and 3 with the flat portions 15 and 16 for the purpose previously described.

Beneath the saddle member 14 are ears 27 for the reception of a fastening cord or strap 28 which may be used with either type of support as shown in Figs. 5 and 9. A second cord or strap 19 is employed the same as in Figs. 2 and 3 for application to the under side and about the horse's tail and should extend between the plaited portion of the natural tail of the horse to maintain the support in proper position. The support of Figs. 6 and 7 has both width and thickness at least in its upper portion and is appropriate for certain occasions, being intended to receive a slightly different form of artificial tail than that used with the support of Figs. 2 and 3.

With the support of Figs. 2 and 3 employing the hook-like arched upper end portion a full length tail of a horse may be used for example as shown in Figs. 4 and 5, wherein as illustrated the tail includes a tanned flattened hide portion 29, the lower ends of which are folded together and connected by stitches 30 to form an envelope or pocket for the reception of the loop or hook of the upper end of the support shown in Figs. 2 and 3 with the extreme upper portion of the flattened portion provided with a tie 31 extended through the ears 17 for anchoring the tail in place. The artificial tail will therefore blend with the natural tail to provide an improved appearance.

With the support of Figs. 6 and 7 which has a width and thickness substantially equal and which presents the spaced oval loops upwardly, the artificial tail used includes a cap or hood 32 which fits over the upper end of the support, such cap being of any desired construction with horse hair stitched or otherwise applied thereto and in such an amount and length as to provide the necessary bulk and flowing appearance to blend with and improve the appearance of the tail of the animal.

With each of the supports illustrated, a strap 33 is connected to the strap 19 and to the girth in order that the tail of the animal may be held in a definite upright position without the top tilting forwardly beyond the desired extent. However, the cord 33 may have one end fastened to the strap 19 at the lower end of device, and extend through a ring 36 attached to the girth 34 and its opposite end fastened about a button or the like 35 so that the cord may be released by the rider without dismounting to allow the horse to raise its tail. Instead of employing an artificial tail of horse hair, it may be made of any desired substitute, such as glass, nylon or other plastic material.

From the foregoing it will be readily understood that by the present invention a horse or other animal shown, whether under saddle, in action at the various gaits or in other types of competition, is caused to have the most satisfactory and pleasing appearance and the use of the present invention has met with immediate enthusiastic acceptance by the public.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A humane tail set comprising an artificial tail for supplementing the natural tail of a horse and a frame for supporting and securing said artificial tail on said natural tail with said natural tail in a downwardly extending position, said frame comprising spaced substantially rigid side members, a curved member secured to said side members and having relatively straight end portions extending outwardly of said side members, said side members terminating at one end in reversely extending portions forming a loop whereby said frame may be disposed in a substantially vertical position with said loop uppermost and with the curved portion of said cross member engaging the outer surface of said natural tail adjacent the base thereof and said straight end portions engaging the buttocks of said horse at each side of said base, ears on said side members, flexible means engaging said ears for securing said frame in position, said artificial tail comprising a hood disposed over said loop and hair secured to said hood and extending downwardly whereby said hair will blend with said natural tail and supplement the same.

2. A humane tail set comprising and artificial tail for supplementing the natural tail of a horse and a frame for supporting and securing said artificial tail on said natural tail with said natural tail in a downwardly extending position, said frame comprising spaced side members, a cross member secured to said side members and having end portions extending outwardly of said side members, said side members terminating at one end in reversely extending positions forming a loop whereby said frame may be disposed in a substantially vertical position with said loop uppermost and with said cross member engaging the outer surface of said natural tail adjacent the base thereof and said end portions engaging the buttocks of said horse at each side of said base, flexible means engaging said side members for securing said frame in position, said artificial tail comprising a hood disposed over said loop and hair secured to said hood and extending downwardly whereby said hair will blend with said natural tail and supplement the same.

3. A humane tail set comprising an artificial tail for supplementing the natural tail of a horse and a frame for supporting and securing said artificial tail on said natural tail with said natural tail in downwardly extending position, said frame comprising spaced side members, a curved cross member secured to said side members and having relatively straight end portions extending outwardly of said side members, said side members also being connected to one end whereby said frame may be disposed in substantially vertical position with said connected end uppermost and with the curved portion of said cross member engaging the outer surface of said natural tail adjacent the base thereof, and said straight end portions engaging the buttocks of said horse at each side of said base, flexible means engaging said side members for securing said frame in position, said artificial tail comprising a hood disposed over said connected end and hair secured to said hood and extending downwardly whereby said hair will blend with said natural tail and supplement the same.

4. A humane tail set comprising an artificial tail for supplementing the natural tail of a horse and a frame for supporting and securing said artificial tail on said natural tail with said natural tail in a downwardly extending position, said frame comprising spaced side members, a cross member secured to said side members, said side members also being connected at one end whereby said frame may be disposed in a substantially vertical position with said connected end uppermost and with said cross member engaging the outer surface of said natural tail adjacent the base thereof, means for securing said frame in position, said artificial tail comprising a hood disposed over said connected end and hair secured to said hood and extending downwardly whereby said hair will blend with said natural tail and supplement the same.

5. A humane tail set comprising an artificial tail for supplementing the natural tail of a horse and a frame for supporting and securing said artificial tail on said natural tail with said natural tail in a downwardly extending position, said frame comprising spaced side members, a cross member secured to said side members, said side members also being connected at one end whereby said frame may be disposed in a substantially vertical position with said connected end uppermost and with said cross member engaging the outer surface of said natural tail adjacent the base thereof, means engaging said side members for securing said frame in position, said artificial tail comprising hair secured to said connected end and extending downwardly whereby said hair will blend with said natural tail and supplement the same.

6. A humane tail set comprising an artificial tail for supplementing the natural tail of a horse and a frame for supporting and securing said artificial tail on said natural tail with said natural tail in a downwardly extending position, said frame comprising spaced side members, means secured to said side members for engaging the outer surface of said natural tail adjacent the base thereof to facilitate locating and supporting said frame, said side members being connected at one end whereby said frame may be disposed in a substantially vertical position with said connected end uppermost, means engaging said side members for securing said frame in position, said artificial tail comprising hair secured to said connected end and extending downwardly whereby said hair will blend with said natural hair and supplement the same.

CHARLES C. TURNER.

REFERENCES CITED

The following references are of record in the file of this patent:

UNITED STATES PATENTS

| Number | Name | Date |
|---|---|---|
| 130,939 | Phillips | Aug. 27, 1872 |